Figure 2:
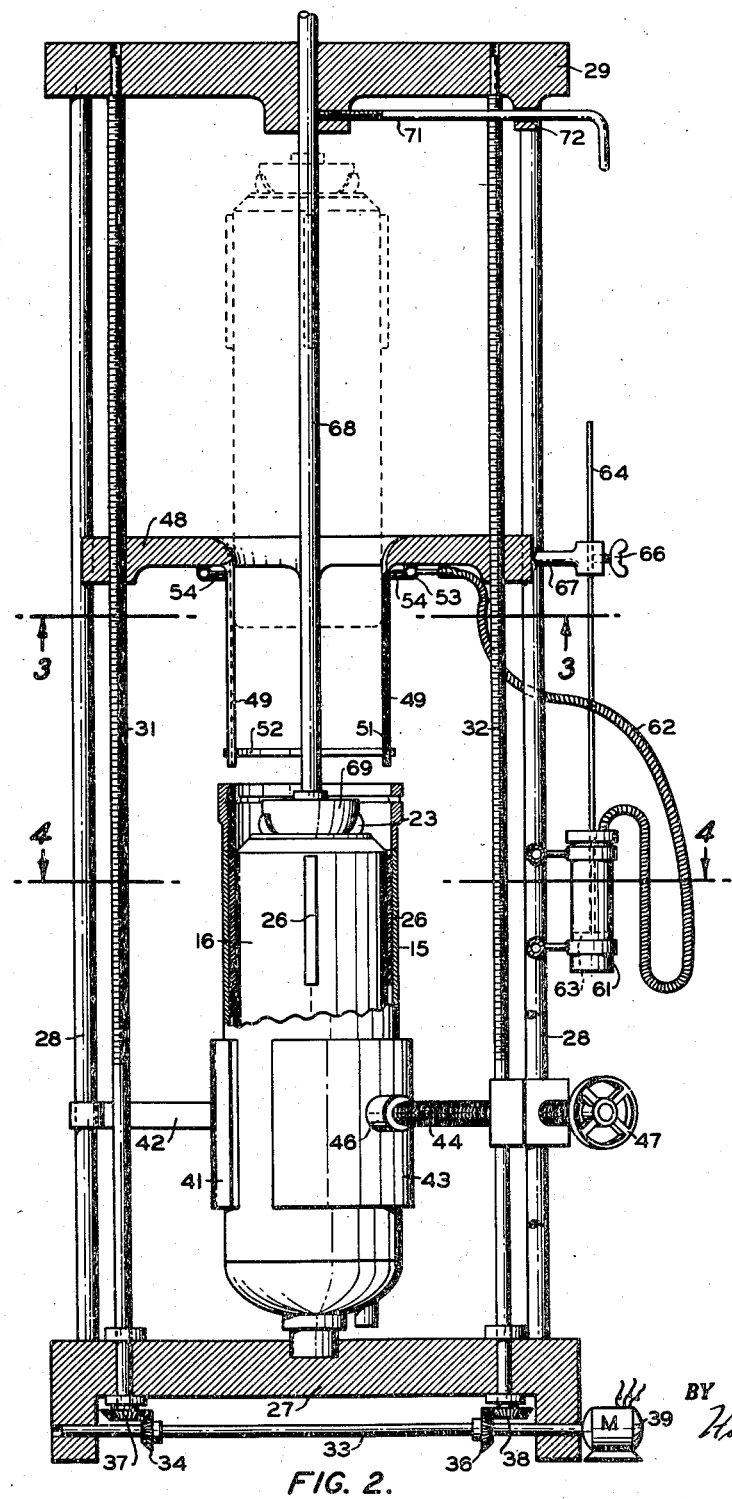

Aug. 1, 1961  E. A. WESTBROOK ET AL  2,994,359
APPARATUS FOR AND METHOD OF PREPARING BONDED ARTICLES
Filed Feb. 20, 1956  5 Sheets-Sheet 1
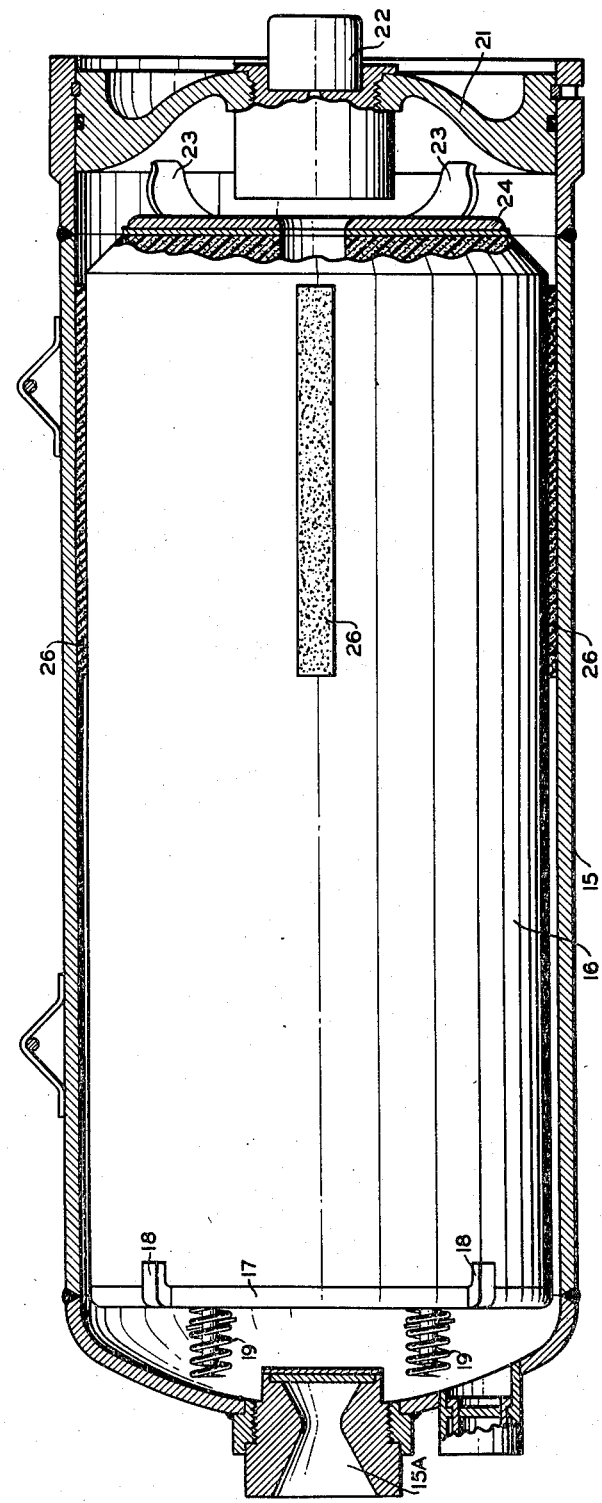
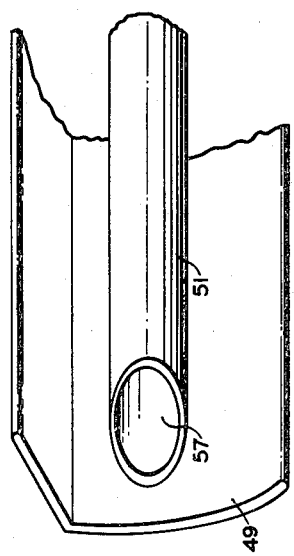
FIG. 6.
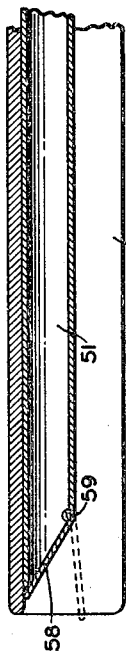
FIG. 7.
INVENTORS.
E. A. WESTBROOK
J. A. SHARP
BY
*Hudson and Young*
ATTORNEYS Aug. 1, 1961  E. A. WESTBROOK ET AL  2,994,359
APPARATUS FOR AND METHOD OF PREPARING BONDED ARTICLES
Filed Feb. 20, 1956  5 Sheets-Sheet 2

INVENTORS.
E. A. WESTBROOK
J. A. SHARP
BY
ATTORNEYS

Aug. 1, 1961  E. A. WESTBROOK ET AL  2,994,359
APPARATUS FOR AND METHOD OF PREPARING BONDED ARTICLES
Filed Feb. 20, 1956                                5 Sheets-Sheet 3

INVENTORS.
E. A. WESTBROOK
J. A. SHARP
BY
Hudson and Young
ATTORNEYS

INVENTORS.
E. A. WESTBROOK
J. A. SHARP
BY
*Hudson and Young*
ATTORNEYS

INVENTORS
E. A. WESTBROOK
J. A. SHARP

United States Patent Office 2,994,359
Patented Aug. 1, 1961

2,994,359
APPARATUS FOR AND METHOD OF PREPARING BONDED ARTICLES
Edgar A. Westbrook and James A. Sharp, Beaumont, Tex., assignors to Phillips Petroleum Company, a corporation of Delaware
Filed Feb. 20, 1956, Ser. No. 566,507
10 Claims. (Cl. 154—1.6)

This invention relates to a method of resiliently mounting one rigid inner member within an outer rigid member. In a further aspect, this invention relates to apparatus for carrying out this method.

This invention is particularly adapted to a method of mounting a rocket grain within a case although the method and apparatus are applicable to other structures wherein the same problems are present. Rocket grains comprising a solid oxidant in a binder, such as asphalt or rubber, are widely used in order to provide thrust for aircraft. Even though a flexible binder is used, the resulting grain is somewhat fragile and a problem exists in that such grains are subject to breakage. If a grain fractures, the burning characteristics of the unit are changed and there is even a possibility of explosion. One attempt to solve this problem has been to provide a flexible mounting at at least one end of the grain so that the grain is resiliently mounted in the case. This has not been entirely satisfactory because some units so mounted have failed to pass a standard test comprising dropping the unit from a four foot height. A newer approach comprises the addition of strips of resilient material positioned between the grain and the case. Rubber, particularly sponge rubber, and cork have been used for mounting the grain in the case and this appears to be satisfactory in preventing breakage. In order to provide good stability, such resilient strips are bonded to the grain and the case in order to maintain the grain in position. This invention relates to a method and apparatus for applying a bonding material to the strips after the grain is inserted in the case.

The following are objects of this invention.

An object of this invention is to provide a method of resiliently mounting a substantially rigid member within an outer substantially rigid member. A further object of this invention is to provide apparatus for carrying out this method. A further object of this invention is to provide a method for supplying adhesive material to a resilient member positioned between a rocket grain and a case.

Figure 8:
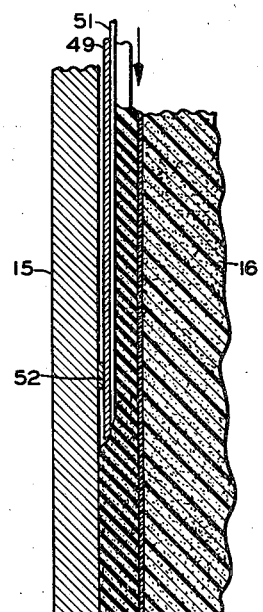
Figure 9:
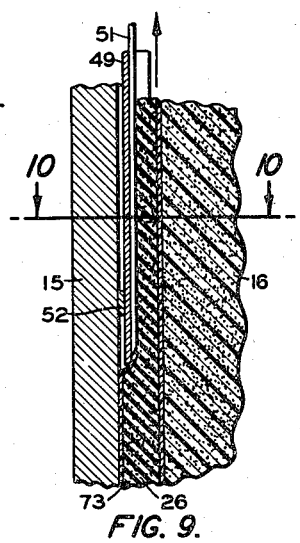
Figure 3:
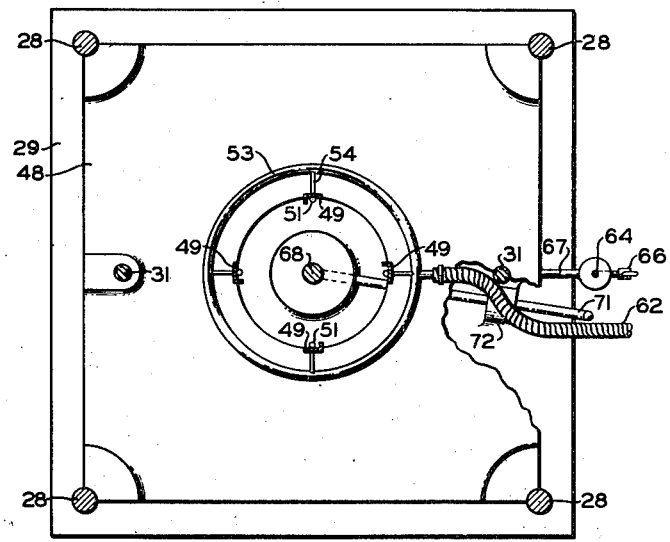
Figure 4:
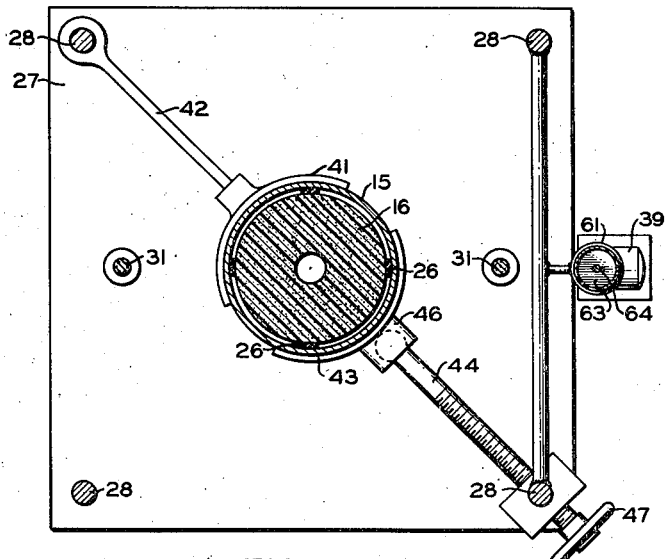
Figure 5:
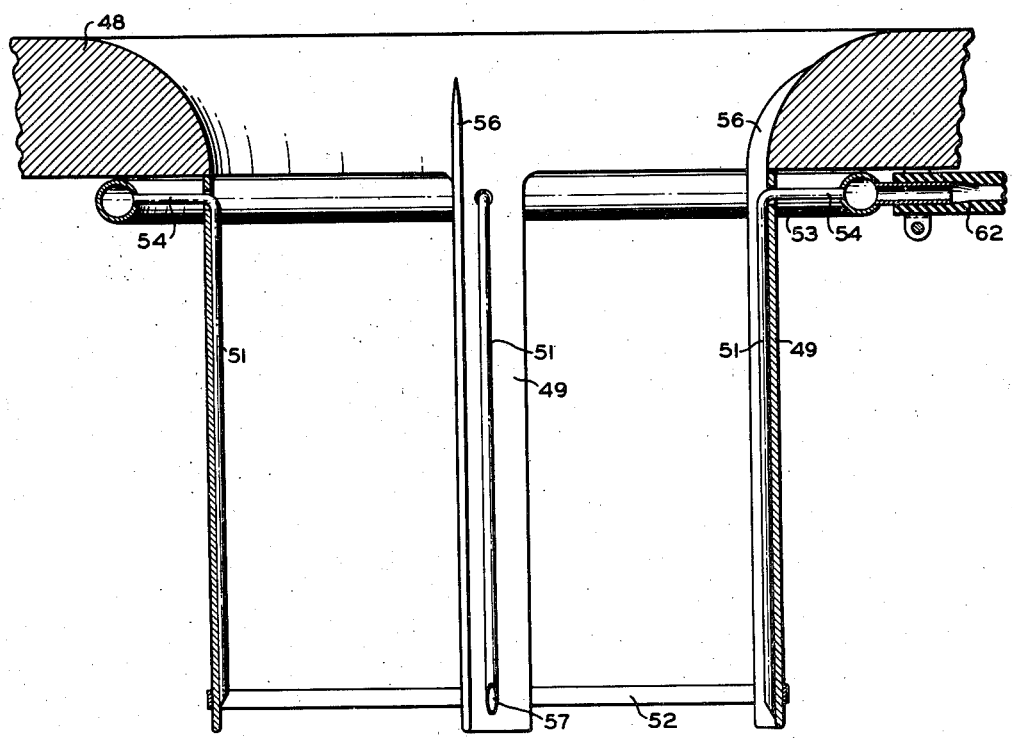
Figures 10, 11, 12:
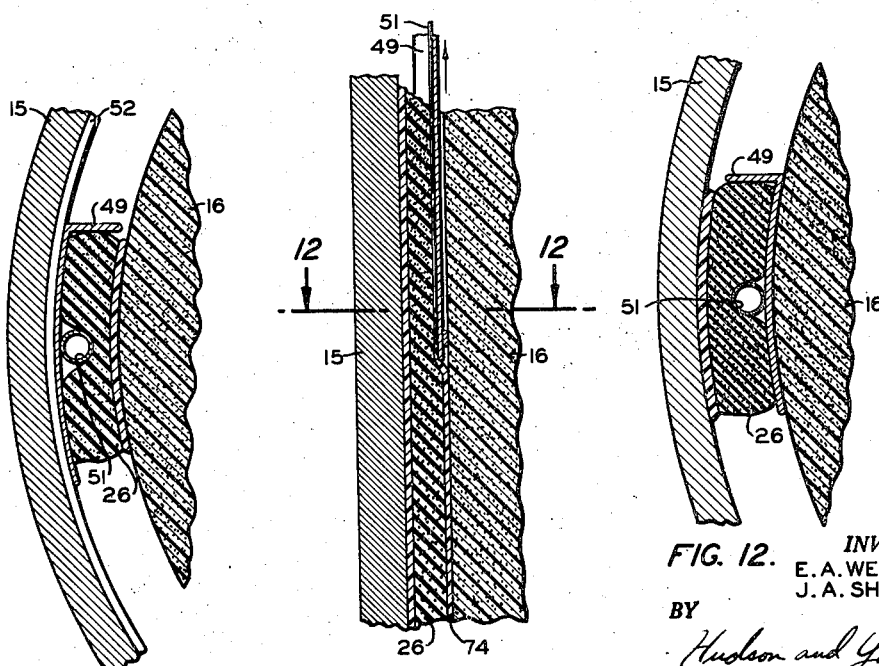
Figure 13:
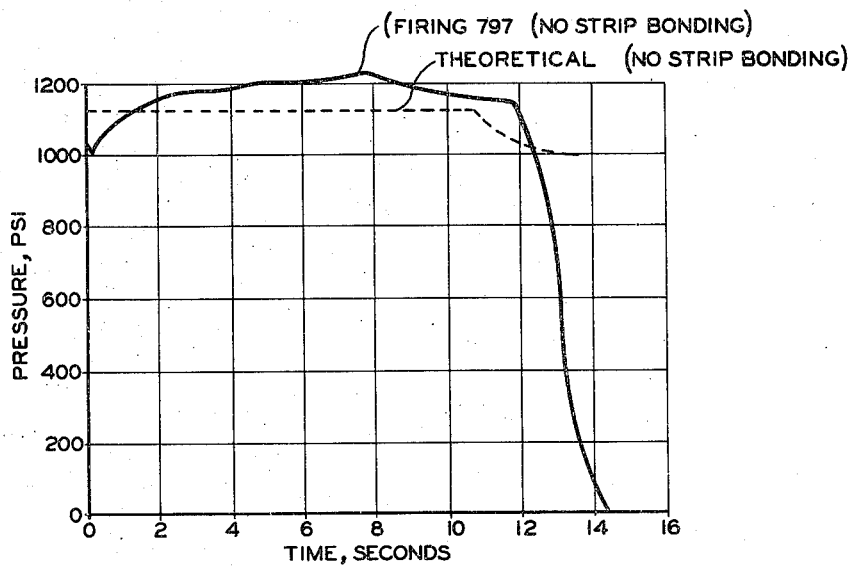

Other objects and advantages of this invention will be apparent to one skilled in the art upon reading this disclosure including the accompanying drawing which comprises:

FIGURE 1, a JATO unit, partly in section;
FIGURE 2, the apparatus, partly in section, for bonding the grain in the case;
FIGURE 3, a view on line 3—3 of FIGURE 2;
FIGURE 4, a view on line 4—4 of FIGURE 2;
FIGURE 5, an enlarged view, partly in section, of the finger support plate having fingers attached thereto;
FIGURE 6, an enlarged perspective view of one of said fingers;
FIGURE 7, an enlarged view of a modification of one of said fingers;
FIGURE 8, a cross-section view of the apparatus showing one of said fingers being inserted prior to application of cement to the resilient material;
FIGURE 9, a cross-section view showing the application of the bonding material;
FIGURE 10, a view on line 10—10 of FIGURE 9;
FIGURE 11, showing a modification of FIGURE 9 wherein the bonding material is applied between the resilient material and the grain;
FIGURE 12, a cross-section on line 12—12 of FIGURE 11;
FIGURE 13, a pressure-time curve showing firing characteristics of a unit without the resilient strip of the present invention; and
FIGURE 14, a pressure-time curve showing the firing characteristics of a unit prepared according to the process of the present invention.

It is believed that this invention can best be understood by reference to the drawings. FIGURE 1 illustrates the completed product prepared according to the process of our invention. This unit comprises the case 15, having nozzle 15A. The grain is represented generally at 16, 17 indicating the aft metal plate thereon. This metal plate 17 is provided with lugs 18 in order to stabilize one end of the charge, the assembly being held in place by springs 19 which contact the aft end of the unit. In the forward end, there is provided closure member 21 containing the firing assembly 22. Charge 16 is held in place by closure member 21 by means of lugs 23 which are attached to end plate 24. This view shows resilient mounting members 26 in place in the completed assembly.

With this description of the completed unit, it is believed that the disclosure of FIGURE 2 should be easily understood, the figure showing the apparatus for bonding the grain in the case. The same numbers are used throughout this disclosure to indicate the same elements and, in FIGURE 2, the case 15 is shown in position, this case having grain 16 therein as well as resilient members 26. The apparatus comprises a base 27 upon which are mounted four vertically extending support rods 28. Also extending vertically are two screws 31 and 32, these screws extending completely through base 27 and upwardly into bearings in top plate 29. These screws are driven by a drive shaft 33, said shaft being provided with bevel gears 34 and 36 which operatively engage bevel gears 37 and 38 upon screws 31 and 32, respectively. Shaft 33 is driven by means of motor 39 provided with suitable speed control (not shown). A fixed clamp member 41 is attached to one support rod 28 by means of bar 42. To a diagonally opposite support rod is attached an adjustable clamp member 43, adjustable by means of screw 44 and universal joint 46 on clamp member 43. This clamp member 43 is moved by means of handle 47. This clamping arrangement is also well illustrated in FIGURE 4, a view on line 4—4 of FIGURE 2.

A finger support plate 48 is positioned between support rods 28 and driven by screws 31 extending through threaded portions therein. Attached to finger support plate 48 are four substantially L-shaped downwardly extending fingers 49, each of said fingers being provided with an adhesive supply tube 51. A support strap 52 supports the lower ends of said fingers. Also attached to finger support plate 48 is a distribution ring 53, said distribution ring being in communication with each of said adhesive supply tubes 51 by means of conduits 54. The fingers and their associated conduits are best shown in FIGURE 5 which is an enlargement of the structure shown in FIGURE 1. This view also shows that the guide members 56 extend upwardly along support plate 48, these being provided to aid in positioning the elements. The lower end 57 of each tube 51 is cut at an angle in order to facilitate entry of these fingers between the rubber and material to which it is being bonded. The lower end of one of these fingers is shown in FIGURE 6 in perspective. FIGURE 7 illustrates a modification wherein plate 58 is hingedly attached at 59 to the lower end of tube 51.

Attached to one of said support rods 28 is a cylinder 61, the outlet of this cylinder being connected, by means of flexible conduit 62, to distributor ring 53. Cylinder 61 is provided with plunger 63 to which is attached a vertically extending rod 64. A clamp 66 is attached to plate 48 by means of rod 67. Clamp 66 is provided so that rod 64 can move independently of, or concurrently with, finger support plate 48.

Extending through top plate 29 is rod 68, this rod being provided with holding means 69 for engaging lugs 23 on the lower end thereof. Rod 68 is moved up and down by suitable means (not shown) and can be stopped in any position by screw clamp 71 extending through boss 72.

FIGURE 3, a view on line 3—3 of FIGURE 2, illustrates the spatial arrangement of the fingers 49, bar 68, tube 62, etc.

This apparatus is adaptable to various types of operation, primarily divided into two modifications. The first method of operation comprises bonding the resilient strips to the grain and subsequently bonding the strips to the case while, as an alternative, the strips can be pre-bonded to the case and subsequently bonded to the grain. The various methods of operation will be more clearly understood when FIGURES 8 through 12 are considered. In one method of operation, the case is placed in position in the apparatus and the adjustable clamp 43 is tightened to hold it in position. The grain 16, having strips bonded thereto, is placed in the case. The rod 68 is lowered to hold the grain in position and finger support plate 48 is lowered into position so that the fingers 49 are positioned between resilient member 26 and the inner portion of case 15. This downward movement is illustrated in FIGURE 8, the resilient material being compressed as finger 49 is moved downwardly. During this operation, clamp 66 is loosened permitting free travel on rod 64 so that no flow of adhesive material takes place from chamber 61. After being fully inserted, clamp 66 is tightened and plate 48 is moved upwardly, this movement being illustrated in FIGURE 9. This upward movement of plate 48 results in upward movement of piston 63, thus forcing adhesive material into conduits 51 from distributor ring 53 and tube 62. This adhesive material is shown as 73 in FIGURE 9. The view on line 10—10 of FIGURE 9 is illustrated in FIGURE 10, this view showing the distortion of strip 26 when finger 49 is in place.

It is obivous that the relative order of bonding these materials can be reversed as shown in FIGURES 11 and 12. In this modification, the strips are first bonded to the case, the grain is inserted, and the fingers, in this modification, are inserted between the resilient member and the grain. Then, on removal of fingers 49, the adhesive 74 is inserted between resilient member 26 and grain 16. A cross-section of FIGURE 11 on line 12—12 is shown as FIGURE 12.

This latter method can be further modified by compressing the resilient members previously bonded to the case before inserting the grain therein. Referring to FIGURE 2, this method is carried out by bonding the strips to the case, inserting the case in position, lowering plate 48 so that the fingers 49 compress the resilient strips 26. The grain 16 is lowered into position and the adhesive applied in accordance with the above description.

In any of these modifications, it is possible to attach the grain 16 to rod 68 by means of holding means 69 on the lower end thereof. The grain can then be suspended as shown by the dotted lines while the case 15 is placed in the apparatus. The grain can then be lowered at the desired time.

Figure 14:
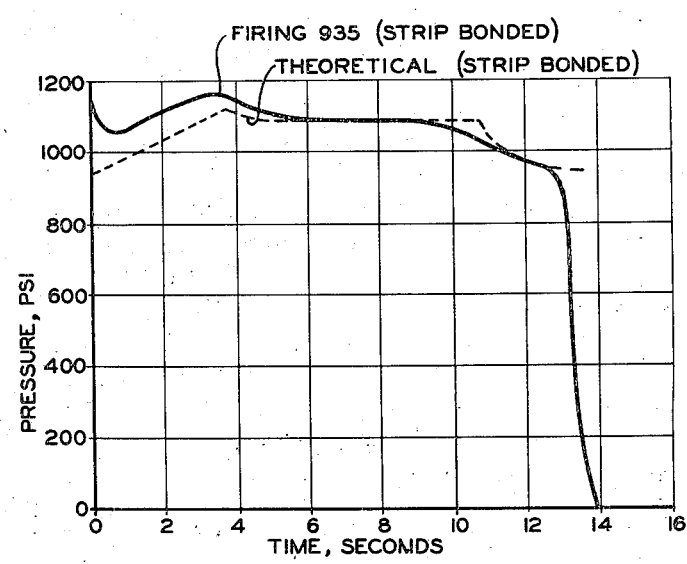

The presence of these rubber strips does affect the firing characteristics of a JATO unit so bonded but the effect is not great, as shown by a comparison of FIGURES 13 and 14. FIGURE 13 shows the theoretical and actual firing characteristics of a grain without the strip bonding of this invention and FIGURE 14 shows the same curves when the unit is prepared according to the method of this invention. In these tests, four strips one inch by ⅜ inch by 10 inches of sponge rubber were applied to the forward end of the grain, the strips being placed 90° apart. The strips were bonded with Dutch Brand 711 Rubber Cement, Rubber Bonding Cement and Thiokol Bonding Agent. The first two of these materials are products of Van Cleef Brothers, Inc. of Chicago and the third of the Thiokol Corp. Strips so bonded required a pull of 1,000 pounds or more to break the bonds and no signs of failure were observed when the units were dropped four feet.

As many possible embodiments may be made of this invention without departing from the scope thereof, it is to be understood that all matter herein set forth is to be interpreted as illustrative and not as unduly limiting the invention.

We claim:

1. A method of resiliently mounting a substantially rigid inner member within a substantially rigid outer member comprising bonding a plurality of longitudinally extending narrow resilient strips to one of said members, said strips covering only a minor portion of the area of the member to which they are applied, inserting said inner member within said outer member and subsequently supplying a bonding compound between each said strip and the second of said members by inserting at least one hollow finger between said strips and one of said members and injecting said bonding compound while withdrawing said finger.

2. A method of resiliently mounting a substantially rigid inner member within a substantially rigid outer member comprising bonding a plurality of longitudinally extending narrow resilient strips to said inner member, said strips covering only a minor portion of the area of the inner member, inserting said inner member into said outer member and subsequently supplying a bonding compound between each said resilient strip and said outer member by inserting at least one hollow finger between said strips and said outer member and injecting said bonding compound while withdrawing said finger.

3. A method of resiliently mounting a substantially rigid inner member within a substantially rigid outer member comprising bonding a plurality of longitudinally extending narrow resilient strips to said outer member, said strips covering only a minor portion of the area of the outer member, compressing said strips, inserting said inner member into said outer member, and subsequently releasing said strips while simultaneously applying a bonding compound between each said strip and said inner member by inserting at least one hollow finger between said strips and said inner member and injecting said bonding compound while withdrawing said finger.

4. Apparatus for resiliently mounting a substantially rigid inner member within a substantially rigid outer member by means of resilient material bonded between said members comprising support means to support said outer member, a longitudinally movable finger support plate; means to move said support plate; a plurality of longitudinally extending fingers attached to said support plate, said fingers being adapted to be positioned between said resilient material and one of said rigid members; a fluid material supply conduit extending longitudinally of each said finger; and means to supply fluid to the fluid material supply conduit in each said finger.

5. Apparatus for resiliently mounting a rocket grain within a case by means of resilient material bonded between said grain and case comprising support means to support said case, a longitudinally movable finger support plate; means to move said support plate; a plurality of longitudinally extending fingers attached to said support plate, said fingers being adapted to be positioned between said resilient material and one of said rigid grain and case; a fluid material supply conduit extending longitudinally of each said finger; and means to supply fluid to the fluid material supply conduit in each said finger.

6. Apparatus for resiliently mounting a substantially rigid inner member within a substantially rigid outer member by means of resilient material bonded between said members comprising a base; a plurality of vertically extending support rods mounted on said base; a top plate supported on said support rods; clamping means adapted to support said outer substantially rigid member; a finger support plate positioned between said support rods; means to raise and lower said support plate, a plurality of substantially L-shaped, downwardly extending fingers attached to said finger support plate; an adhesive supply tube extending down each said finger; means to supply adhesive to each said adhesive supply tube; and a rod extending through said top plate adapted to hold said inner member in said outer member.

7. Apparatus for resiliently mounting a substantially rigid inner member within a substantially rigid outer member by means of resilient material bonded between said members comprising a base; four vertically extending support rods mounted on said base, a top plate supported on said support rods; two screws extending between said base and said top plate; a drive shaft; a bevel gear on the lower end of each of said screws; bevel gears on drive shaft engaging said bevel gears on said shafts; a motor attached to said drive shaft; a fixed clamp member attached to one of said support rods; an adjustable clamp member attached to the support rod diagonally opposite said fixed clamp member; a finger support plate positioned between said support rods, said screws extending through threaded portions therein; four substantially L-shaped, downwardly extending fingers attached to said finger support plate; an adhesive supply tube extending down each said finger; the end of said supply tube being beveled downwardly to said finger; a support strap connecting the lower ends of said fingers; a distributor ring positioned on said finger support plate and surrounding said fingers; conduits connecting said distributor ring and each of said adhesive supply tubes; an adhesive supply cylinder attached to one of said support rods; a plunger in said cylinder; a vertically extending rod attached to said plunger; a releasable clamp connecting said vertically extending rod attached to said plunger and said finger support plate; a flexible conduit connecting the outlet of said supply cylinder and said distributor ring; a rod extending through said top plate; holding means on the lower end of said last-mentioned rod and a screw clamp in said top plate adapted to stop movement of said last-mentioned rod.

8. A method of resiliently mounting a rocket grain within a case comprising bonding a plurality of longitudinally extending narrow resilient strips to one of said grain and case, said strips covering only a minor portion of the area of the member to which they are applied, inserting said grain within said case and subsequently supplying a bonding compound between each said strip and the second of said grain and case by inserting at least one hollow finger between said strips and said second of said grain and case and injecting said bonding compound while withdrawing said finger.

9. A method of resiliently mounting a rocket grain within a case comprising bonding a plurality of longitudinally extending narrow resilient strips to said grain, said strips covering only a minor portion of the area of the grain, inserting said grain into said case and subsequently supplying a bonding compound between each said resilient strip and said case by inserting at least one hollow finger between said strips and said case and injecting said bonding compound while withdrawing said finger.

10. A method of resiliently mounting a rocket grain within a case comprising bonding a plurality of longitudinally extending narrow resilient strips to said case, said strips covering only a minor portion of the area of the case, compressing said strips, inserting said grain into said case, and subsequently releasing said strips while simultaneously supplying a bonding compound between each said strip and said grain by inserting at least one hollow finger between said strips and said grain and injecting said bonding compound while withdrawing said finger.

References Cited in the file of this patent
UNITED STATES PATENTS

| | | |
|---|---|---|
| 2,382,569 | Kilborn | Aug. 14, 1945 |
| 2,407,559 | Krotz | Sept. 10, 1946 |
| 2,522,171 | Furman et al. | Sept. 12, 1950 |
| 2,563,265 | Parsons | Aug. 7, 1951 |
| 2,816,418 | Loedding | Dec. 17, 1957 |